(12) United States Patent
Su

(10) Patent No.: US 9,681,675 B2
(45) Date of Patent: Jun. 20, 2017

(54) RACK STRUCTURE OF YOGURT MACHINE

(71) Applicant: CHANG YUE INDUSTRIAL CORPORATION, Tainan (TW)

(72) Inventor: Yung-Sen Su, Tainan (TW)

(73) Assignee: CHANG YUE INDUSTRIAL CORPORATION, Tainan (TW)

( * ) Notice: Subject to any disclaimer, the term of this patent is extended or adjusted under 35 U.S.C. 154(b) by 0 days.

(21) Appl. No.: 14/845,278

(22) Filed: Sep. 4, 2015

(65) Prior Publication Data

US 2017/0065129 A1  Mar. 9, 2017

(51) Int. Cl.
*A23C 9/12* (2006.01)
*A47B 87/02* (2006.01)

(52) U.S. Cl.
CPC ........ *A23C 9/1226* (2013.01); *A47B 87/0207* (2013.01)

(58) Field of Classification Search
CPC .............. A23C 9/1226; B65D 81/3216; A47B 87/0276; A47B 73/00; A47B 73/006; A47B 87/02; A47B 87/0207; A47B 87/0215; A47B 87/0253; A47B 87/0261; A47B 75/00; A47G 23/0641; A47G 23/065; A47G 2400/06; A47F 7/28; A47F 7/281; A47F 7/283; A47F 7/0071
USPC .......... 426/34, 43, 583; 211/71.01, 74, 85.4, 211/126.2, 128.1, 194; 422/560, 561; 206/562, 427, 509; 220/23.83, 23.6, 220/23.86, 507, 512
See application file for complete search history.

(56) References Cited

U.S. PATENT DOCUMENTS

| | | | | | |
|---|---|---|---|---|---|
| 2,187,196 | A | * | 1/1940 | Douglass | A45C 11/20 126/261 |
| 4,009,368 | A | * | 2/1977 | Faivre | A23C 9/1226 126/273.5 |
| 4,574,776 | A | * | 3/1986 | Hidle | A47J 27/04 126/369 |
| 4,947,991 | A | * | 8/1990 | Snell | A47G 23/0641 206/427 |
| 5,938,060 | A | * | 8/1999 | Rutland, Jr. | A47G 23/0641 220/23.6 |

(Continued)

FOREIGN PATENT DOCUMENTS

| FR | 2956301 A1 * | 8/2011 | ........... A23C 9/1226 |
|---|---|---|---|
| FR | WO 2011144870 A1 * | 11/2011 | ........... A23C 9/1226 |

*Primary Examiner* — Daniel J Troy
*Assistant Examiner* — Hiwot Tefera
(74) *Attorney, Agent, or Firm* — Leong C. Lei

(57) ABSTRACT

A rack of a yogurt machine is disclosed. The yogurt machine includes a main body, which has a surface to which a controller is mounted and is recessed to form an accommodation compartment for receiving a blower assembly mounted therein and in connection with the controller. At least one rack is mounted atop the main body and includes, at a lower portion thereof, a lower rack frame that is stacked on and coupled to the main body. The lower rack frame has an inner surface on which coupling projections are mounted and is coupled, with a top thereof, to an upper rack frame that is inwardly contracted with respect to and extends upward from the lower rack frame. The upper rack frame receives a horizontal support board therein and includes yogurt fermentation cups mounted thereto. A top cover is fit to a top rim of the upper rack frame.

3 Claims, 8 Drawing Sheets

(56) References Cited

U.S. PATENT DOCUMENTS

| | | | | |
|---|---|---|---|---|
| 6,321,925 B1* | 11/2001 | Crouse | ............... | B65D 21/083 |
| | | | | 220/23.86 |
| 6,491,179 B2* | 12/2002 | Dokun | ............... | A47G 23/0641 |
| | | | | 220/507 |
| 7,525,042 B2* | 4/2009 | Lazzaro | ............... | H02G 3/086 |
| | | | | 174/135 |
| 8,794,442 B2* | 8/2014 | Nicoletti | ............... | B65D 5/503 |
| | | | | 206/486 |
| 9,173,543 B2* | 11/2015 | Abraham | ............... | A47L 15/501 |
| 2009/0050587 A1* | 2/2009 | Sandor | ............... | A47L 15/501 |
| | | | | 211/74 |
| 2010/0307116 A1* | 12/2010 | Fisher | ............... | B65D 81/2076 |
| | | | | 53/492 |

* cited by examiner

RACK STRUCTURE OF YOGURT MACHINE

TECHNICAL FIELD OF THE INVENTION

The present invention relates generally to a rack structure of a yogurt machine and is in the technical field of a yogurt machine that comprises a main body to which a rack is mounted for increasing the capacity of a yogurt fermentation cup of the yogurt machine.

DESCRIPTION OF THE PRIOR ART

The advance of technology and science makes living schedule tighter than ever and people hardly keep any leisure or free time for themselves. Consequently, all the necessaries of life must be purchased from shops or outsourced. However, food safety is always a severe issue of a modern society and the general consumers are heavily concerned about food security of prepared or cooked foodstuffs purchased from shops, particularly for those produced by food factories. Yogurt and related products are also mass-produced in factories.

Most of the yogurt products available in the market are added with a large amount of pigments, flavoring, clouding agents, and other unknown additives and preservatives generally for extending storage time and satisfying the tastes of consumers. The amount of yogurt included in a yogurt product is generally reduced and the cost is also reduced. The reduction of cost helps improve the market competition power. However, this makes the yogurt product lose the nutrition that it is supposed to have.

In view of these problems, the present invention aims to provide a solution that allows users to make yogurt of high purity by themselves.

SUMMARY OF THE INVENTION

Due to the problems that the yogurt that is available in the market is generally added with a large amount of pigments, flavoring, clouding agents, and other unknown additives and preservatives, the present invention aims to provide a device that helps users to make yogurt of high purity by themselves by providing a yogurt machine in which a constant-temperature airflow is induced to accelerate yogurt culturing.

The present invention provides a yogurt machine that comprises a main body. The main body has a surface on which a controller is mounted. The main body is recessed to form an accommodation compartment that receives a blower assembly mounted therein and in connection with the controller. At least one rack is mounted on a top of the main body. The rack comprises, at a lower portion thereof, a lower rack frame that is stacked on and coupled to the main body. The lower rack frame has an inner circumferential surface on which coupling projections are mounted. The lower rack frame is coupled, with a top thereof, to an upper rack frame that is inwardly contracted with respect to and extends upward from the lower rack frame. The upper rack frame has an outer circumferential wall in which coupling recesses are formed. The upper rack frame receives a support board that is laid horizontally therein. The support board comprises yogurt fermentation cups mounted thereto. A top cover is removably fit to a top rim of the upper rack frame of the rack.

In the above yogurt machine, at least one additional rack is mounted atop the rack in such a way that the additional rack comprises coupling projections supported on a top rim of the upper rack frame. The top cover is removably fit to the additional rack.

Further, in the above yogurt machine, at least one additional rack is mounted to a top of the rack. The additional rack comprises coupling projections that are respectively fit into the coupling recesses of the rack so that the additional rack is retracted downward to be located within the upper rack frame of the rack.

The efficacies of the present invention are that the yogurt machine comprises a rack coupled to a top of a main body and an additional top rack is coupled to a top of the rack, so that through the upward expansion of the racks, the number of the yogurt fermentation cups that can be accommodated in the yogurt machine 1 is increased The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
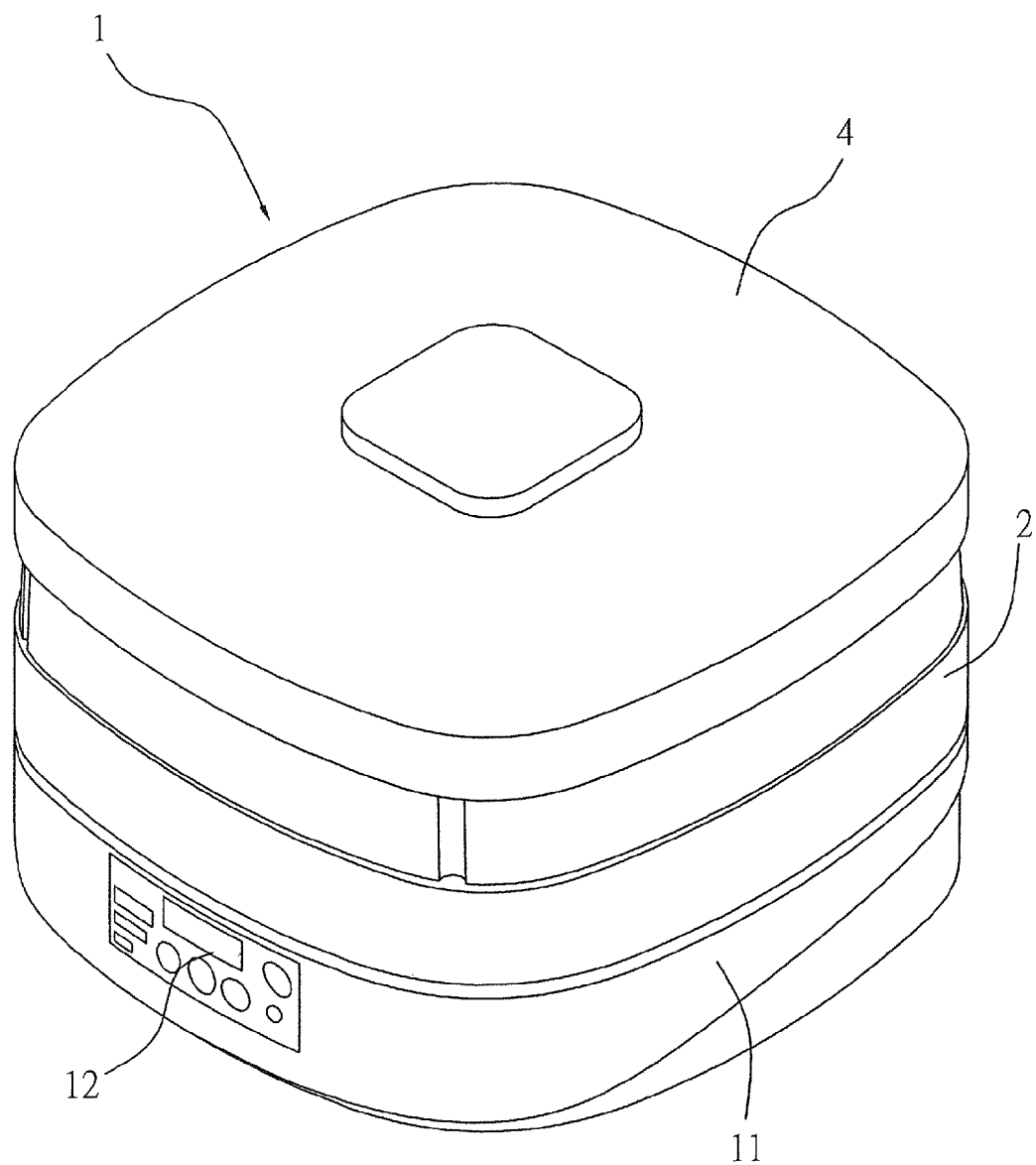
FIG. 1 is a perspective view of a yogurt machine according to the present invention.
Figure 2:
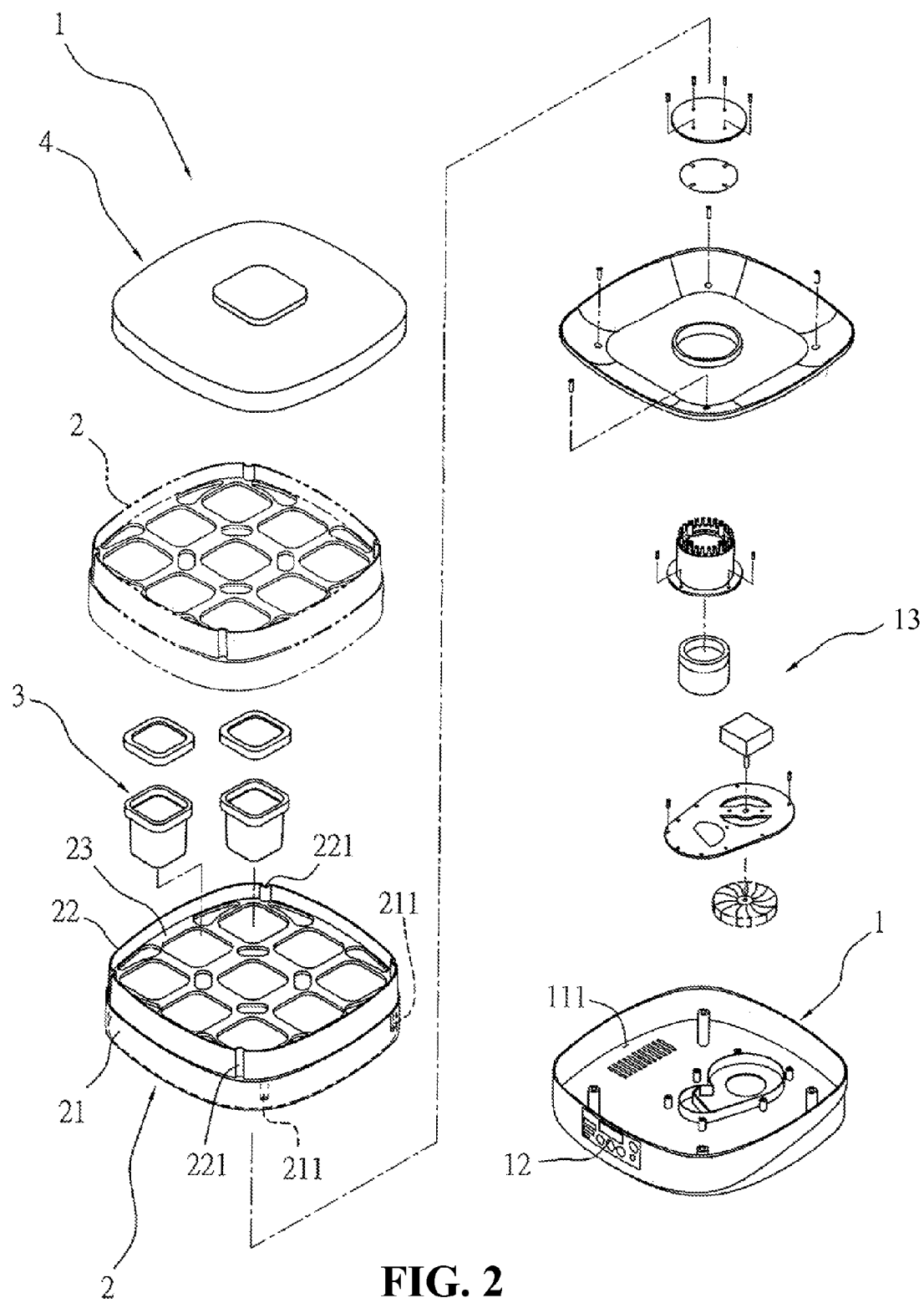
FIG. 2 is an exploded view of the yogurt machine of the present invention.
Figure 3:
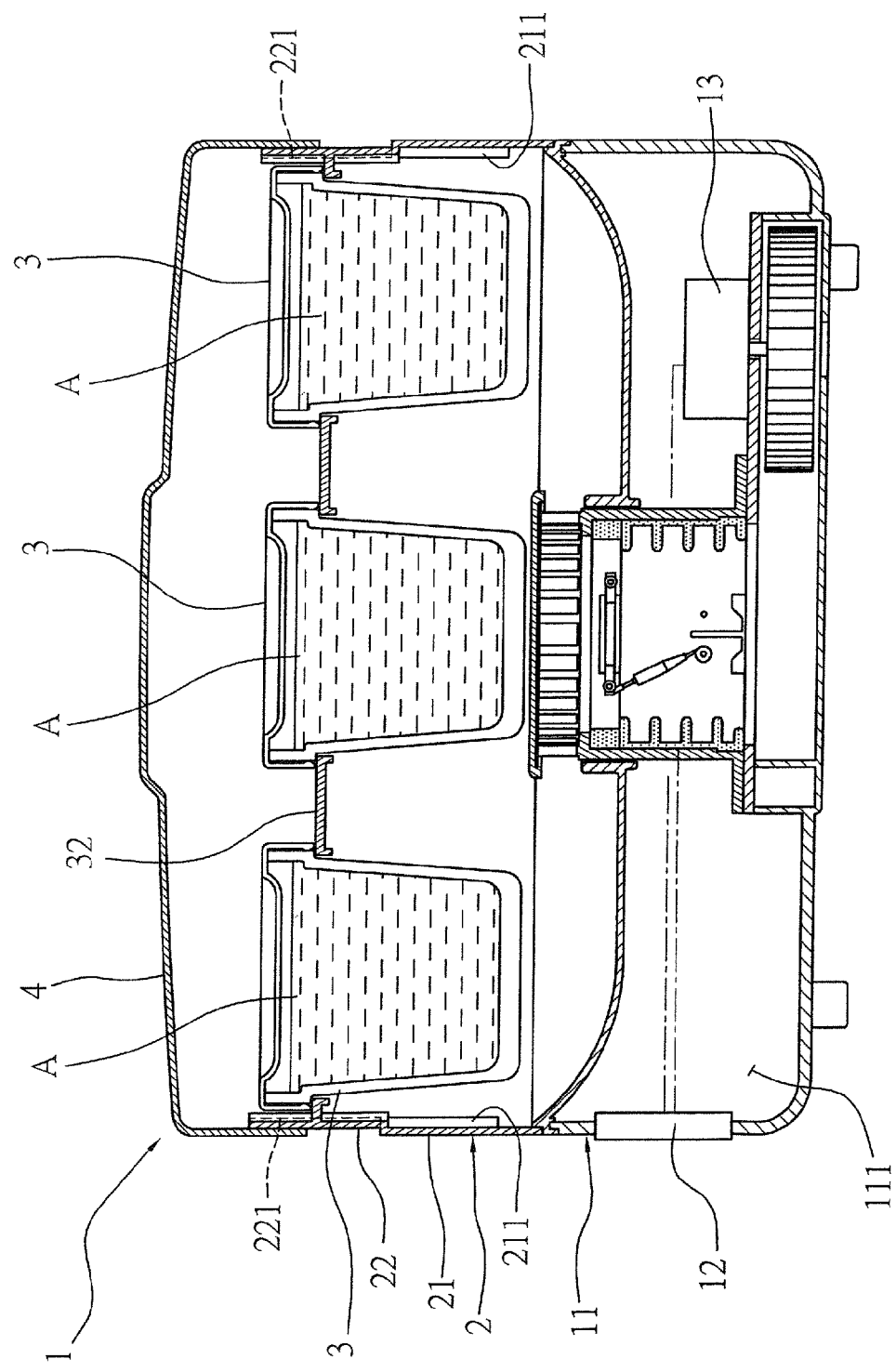
FIG. 3 is a cross-sectional view of the yogurt machine in an assembled form, illustrating an operation thereof.

Referring to FIGS. 1, 2, 3, 4, 5, and 6, which are respectively a perspective view of a yogurt machine according to the present invention, an exploded view of the yogurt machine, a cross-sectional view of the yogurt machine in an assembled form, illustrating an operation thereof, an exploded view illustrating a rack according to the present invention, a top plan view of the rack, and a schematic view illustrating an additional rack mounted to a top of the rack of the present invention, the present invention provides a structure of a rack 2 of a yogurt machine 1. The yogurt machine 1 comprises at least a main body 11. The main body 11 has a surface on which a controller 12 is mounted. The main body 11 is recessed to form an accommodation compartment 111. The accommodation compartment 111 receives a blower assembly 13 mounted therein and in connection with the controller. At least one rack 2 is mounted on a top of the main body 11. The rack 2 comprises, at a lower portion thereof, a lower rack frame 21 that is stacked on and coupled to the main body 11. The lower rack frame 21 has an inner circumferential surface on which coupling projections 211 are mounted. The lower rack frame 21 is coupled, with a top thereof, to an upper rack frame 22 that is inwardly contracted with respect to and extends upward from the lower rack frame. The upper rack frame 22 has an outer circumferential wall in which coupling recesses 221 are formed. The upper rack frame 22 receives a support board 23 that is laid horizontally therein. The support board 23 comprises yogurt fermentation cups 3 mounted thereto. A top cover 4 is removably fit to a top rim of the upper rack frame 22 of the rack 2 (as shown in FIGS. 2 and 3). It is noted here that the inner circumferential surface of the lower rack frame 21 and the outer circumferential wall and the top rim of the upper rack frame 22 are not labeled in the drawings.

Figure 4:
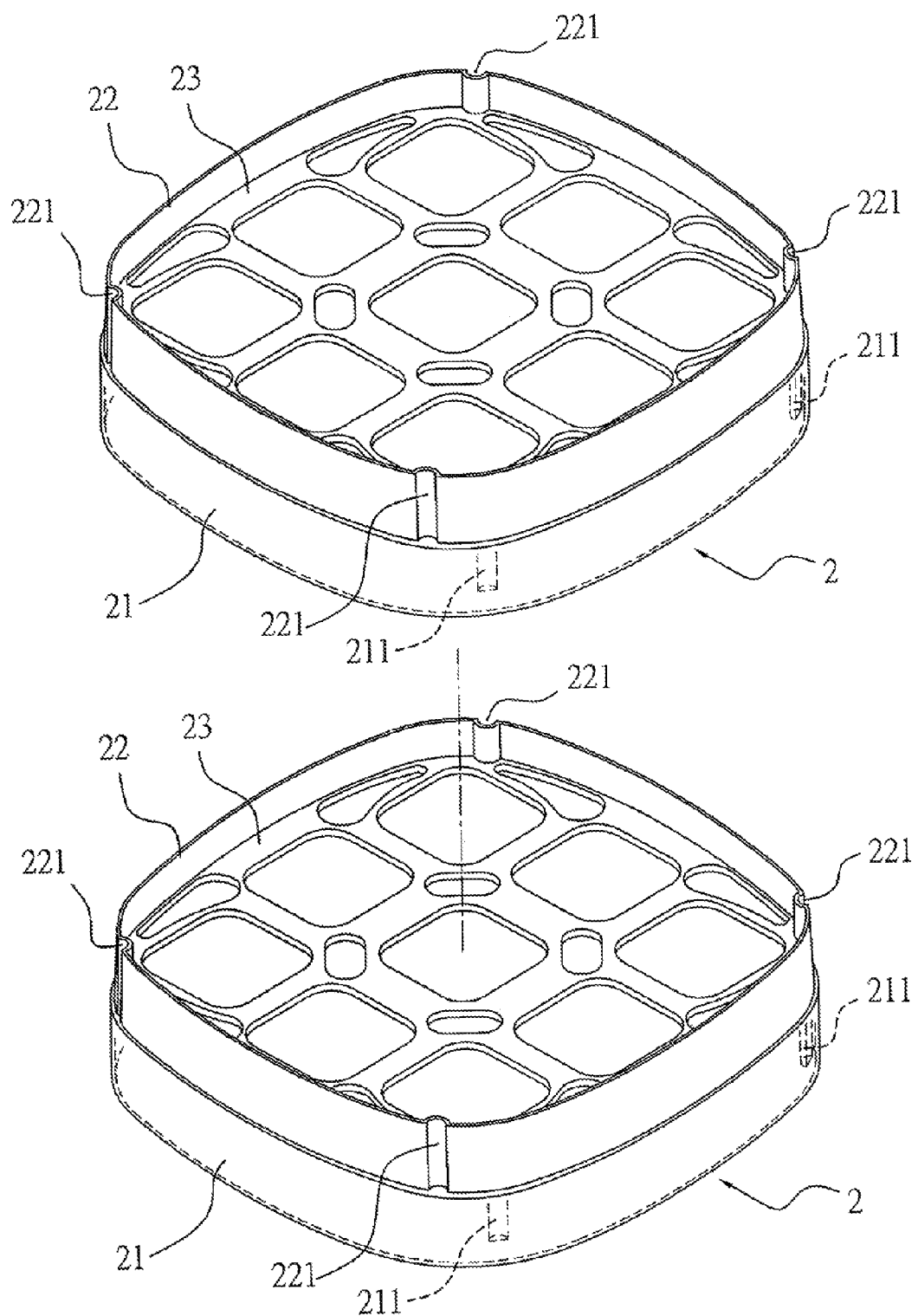
FIG. 4 is an exploded view illustrating a rack according to the present invention.
Figure 5:
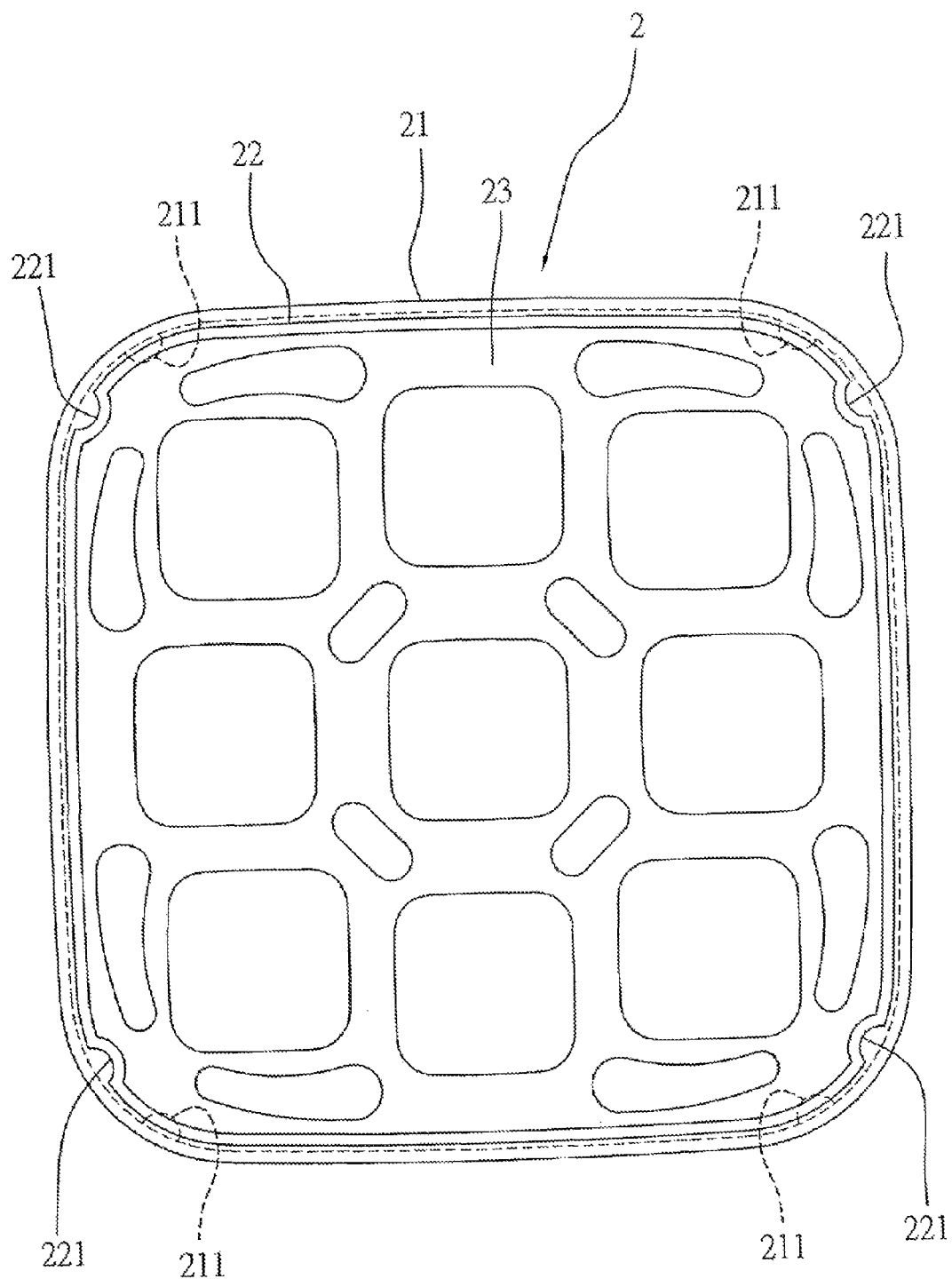
FIG. 5 is a top plan view of the rack of the present invention.
Figure 6:
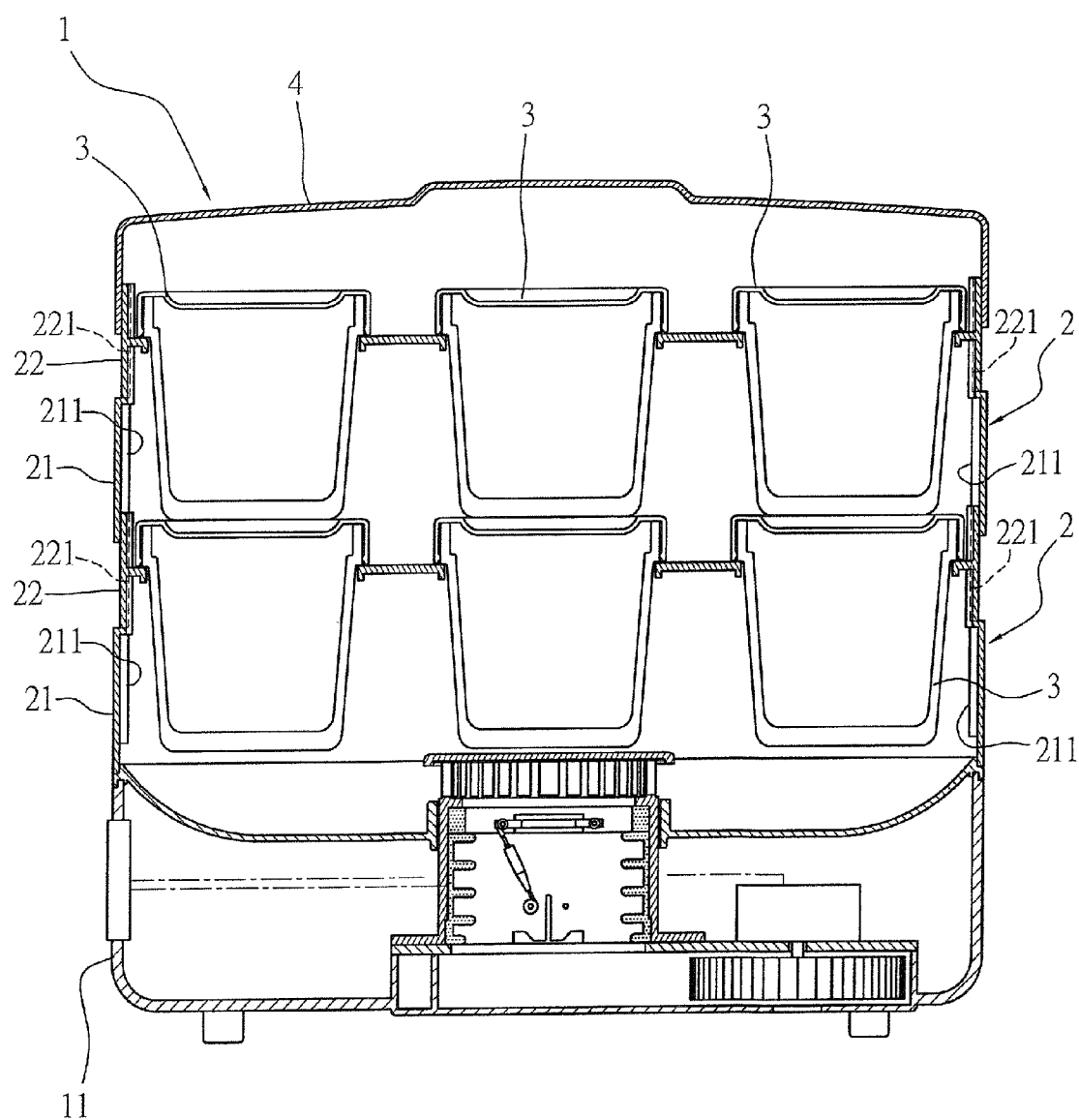
FIG. 6 is a schematic view illustrating an additional rack mounted to a top of the rack of the present invention.

An additional rack 2 may be selectively mounted to a top of the rack 2 in such a way that the additional top rack 2 is supported on the top rim of the upper rack frame 22 by means of the coupling projections 211 thereof and the top cover 4 may thus be removably fit to a top of the additional top rack 2. As such, the yogurt machine 1 is arranged by having a lower rack 2 mounted to a top of the main body 11 and an additional top rack 2 mounted to a top of the lower rack 2. With the racks 2 being stacked and expanded upwards, the number of the yogurt fermentation cups 3 that can be accommodated in the yogurt machine 1 can be increased. Further, the yogurt machine 1 is operated by having milk product A that is provided for fermentation of yogurt received and contained in the yogurt fermentation cups 3, as shown in FIGS. 4, 5, and 6, wherein the milk product A is shown in FIG. 3 and the top rim of the upper rack frame 22 is not labeled, and yogurt is not labeled in the drawings.

Figure 7:
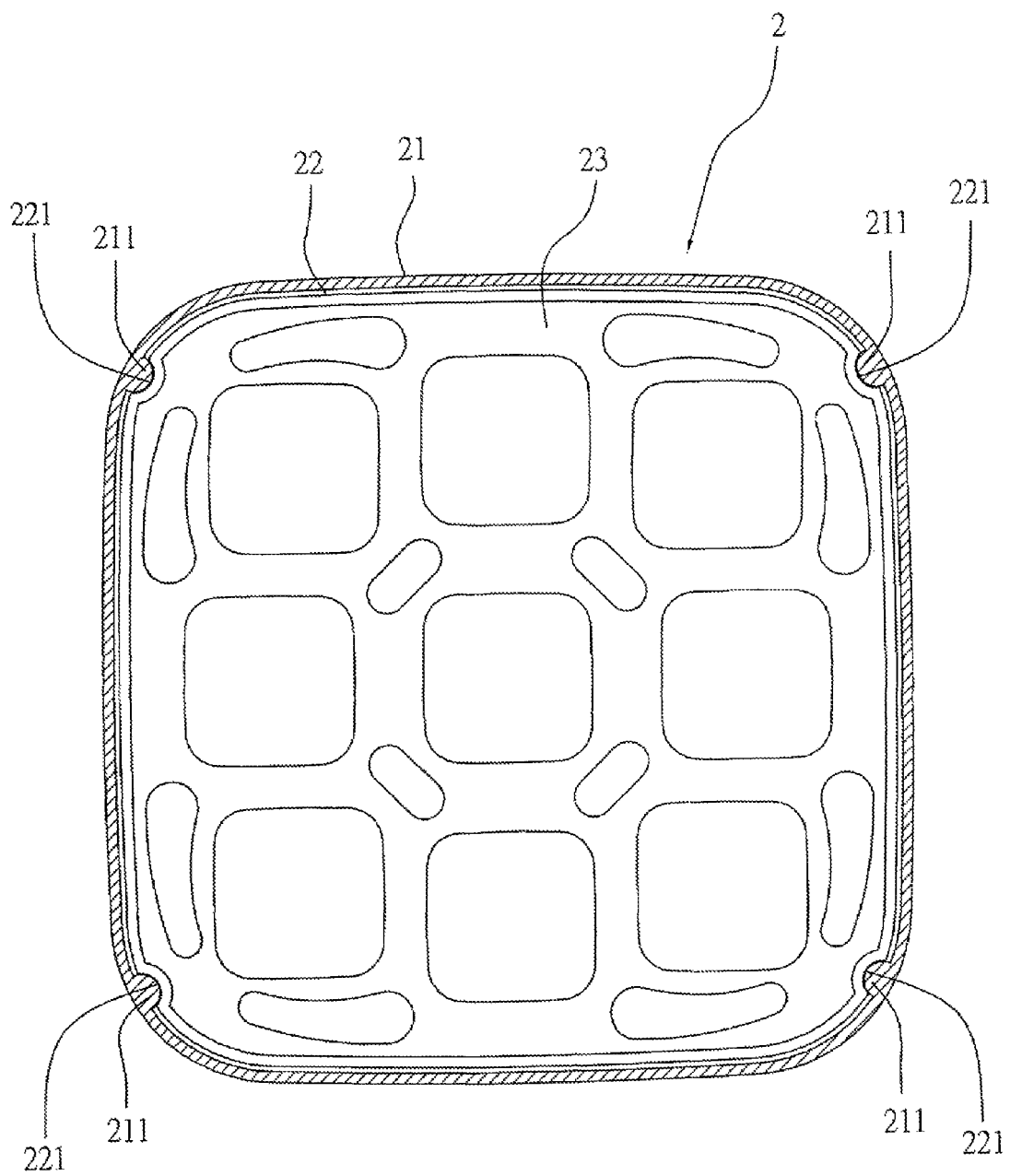
FIG. 7 is another top plan view of the rack of the present invention.
Figure 8:
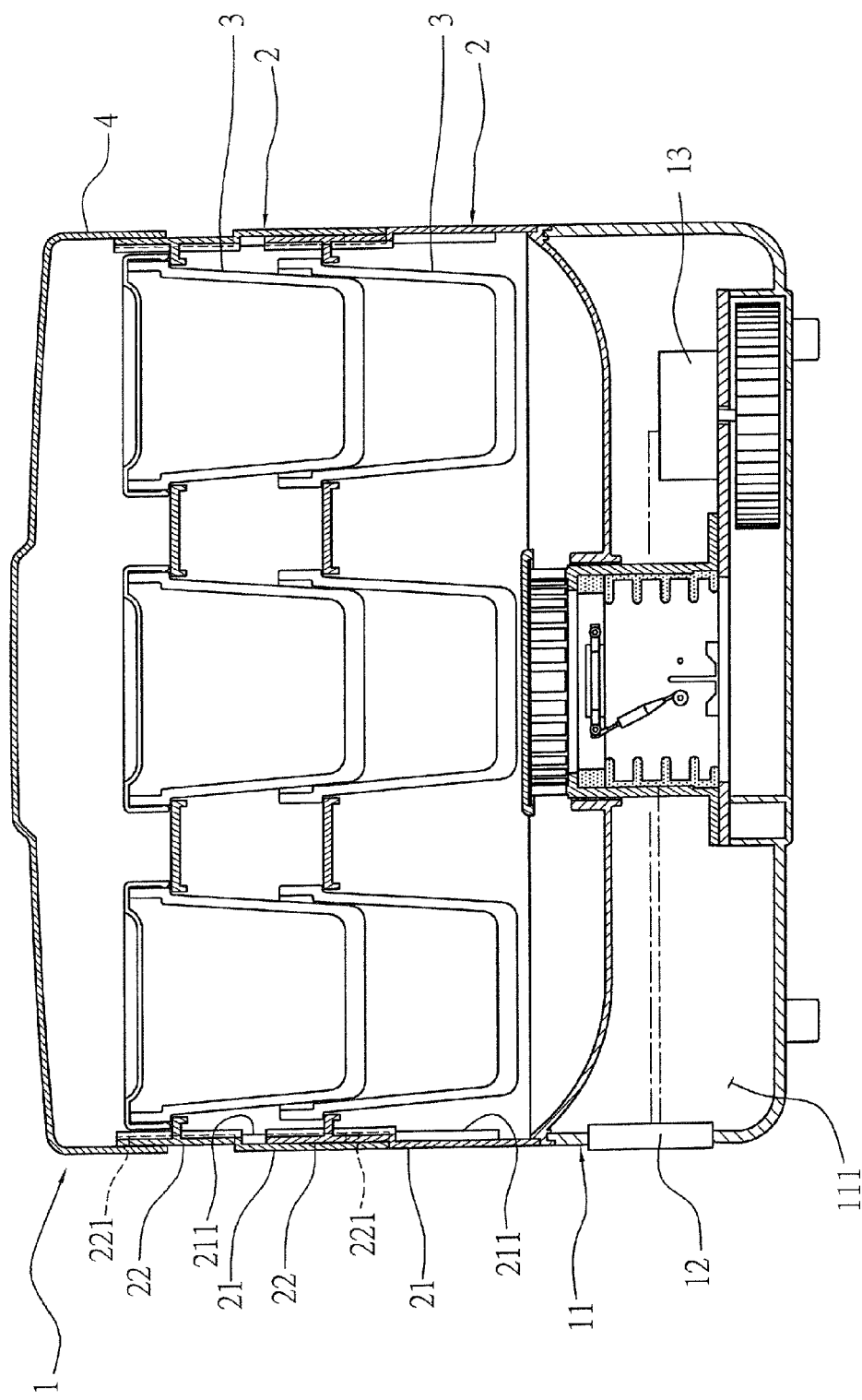
FIG. 8 is a schematic view illustrating downward retraction of an additional top rack according to the present invention.

Referring to FIGS. 7 and 8, which are respectively another top plan view of the rack of the present invention and a schematic view illustrating downward retraction of an additional top rack according to the present invention, the rack 2 may receive an additional top rack 2 coupled to a top thereof for expansion, wherein the top rack 2 may be positioned to have the coupling projections 211 thereof respectively fit into the coupling recesses 221 of the lower rack 2, so that the top rack 2 may be retracted downward to a position located within the upper rack frame 22 of the lower the rack 2. In this way, the space necessary for warehousing, shipping and user's storage of the yogurt machine 1 can be reduced.

It can be known from the above description that the present invention provides a yogurt machine 1 that comprises a rack 2 coupled to a top of a main body 11 and an additional top rack 2 is coupled to a top of the rack 2, so that through the upward expansion of the racks 2, the number of the yogurt fermentation cups 3 that can be accommodated in the yogurt machine 1 is increased. Further, with the coupling projections 211 supported on a top rim of the upper rack frame 22, the upward expansion rack 2 can be securely fixed to the lower rack 2. (Yogurt is not labeled here.)

The yogurt machine 1 is arranged such that a rack 2 is coupled to a top of a main body 11 and the rack 2 may receive an additional top rack 2 coupled to a top thereof for expansion, wherein the top rack 2 may be positioned to have the coupling projections 211 thereof respectively fit into the coupling recesses 221 of the lower rack 2, so that the top rack 2 may be retracted downward to a position located within the upper rack frame 22 of the lower the rack 2. In this way, the space necessary for warehousing, shipping and user's storage of the yogurt machine 1 can be reduced.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A rack of a yogurt machine, wherein the yogurt machine comprises at least a main body, the main body having a surface on which a controller is mounted, the main body being recessed to form an accommodation compartment that receives a blower assembly mounted therein and in connection with the controller, at least one rack being mounted on a top of the main body, the rack having a circumferential wall that has an inner circumferential surface and an outer circumferential surface and comprising, at an upper portion and a lower portion thereof respectively, an upper rack frame and a lower rack frame that is stacked on and coupled to the main body, the lower rack frame having coupling projections formed on the inner circumferential surface, the lower rack frame being coupled, with a top thereof, to the upper rack frame that is inwardly contracted with respect to and extends upward from the lower rack frame, the upper rack frame having coupling recesses formed in the outer circumferential surface, the upper rack frame receiving a support board that is laid horizontally therein, the support board comprising yogurt fermentation cups mounted thereto, a top cover being removably fit to a top rim of the upper rack frame of the rack;

wherein the coupling projections and the coupling recesses are respectively located on the inside and outside circumferential surfaces that are opposite to each other.

2. The rack of the yogurt machine according to claim 1, wherein at least one additional rack is mounted atop the rack in such a way that the additional rack comprises coupling projections having lower ends supported on a top rim of the upper rack frame, the top cover being removably fit to the additional rack.

3. The rack of the yogurt machine according to claim 1, wherein at least one additional rack is mounted to a top of the rack, the additional rack comprising coupling projections that are respectively fit into the coupling recesses of the rack so that the additional rack is retracted downward to be located within the upper rack frame of the rack, wherein a lower end of each of the coupling recesses of the rack forms a step and a lower end of each of the coupling projections of the additional rack is positioned on and supported by the step to allow the additional rack to be received in the upper rack frame of the rack.

* * * * *